United States Patent
Bangalore Srinivas et al.

(10) Patent No.: US 11,577,560 B2
(45) Date of Patent: Feb. 14, 2023

(54) AUTOMATED CARRIER TUGGER MOUNTED ON AN AUTONOMOUS MOBILE ROBOT FOR TUGGING A CARRIER

(71) Applicant: Tata Consultancy Services Limited, Mumbai (IN)

(72) Inventors: Venkatesh Prasad Bangalore Srinivas, Bangalore (IN); Pradeep Prabhakar Kamble, Bangalore (IN); Venkat Raju Chintalapalli Patta, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 155 days.

(21) Appl. No.: 17/207,130

(22) Filed: Mar. 19, 2021

(65) Prior Publication Data

US 2022/0080793 A1    Mar. 17, 2022

(30) Foreign Application Priority Data

Sep. 16, 2020  (IN) .............................. 202021040100

(51) Int. Cl.
*B60D 1/52* (2006.01)
*B60D 1/24* (2006.01)
*B60D 1/00* (2006.01)

(52) U.S. Cl.
CPC ................ *B60D 1/52* (2013.01); *B60D 1/246* (2013.01); *B60D 2001/001* (2013.01)

(58) Field of Classification Search
CPC ................................ B60D 1/145; B60D 1/246
See application file for complete search history.

(56) References Cited

U.S. PATENT DOCUMENTS

| | | | |
|---|---|---|---|
| 6,244,366 B1 * | 6/2001 | Otterson | B62D 51/04 180/19.1 |
| 10,668,617 B2 * | 6/2020 | Jacobsen | B25J 11/008 |
| 11,433,530 B2 * | 9/2022 | Bangalore Srinivas | B25J 9/109 |
| 2006/0042842 A1 * | 3/2006 | Berg | A47F 10/04 180/19.1 |
| 2018/0281178 A1 * | 10/2018 | Jacobsen | B25J 11/008 |
| 2019/0126697 A1 * | 5/2019 | Adachi | B61B 13/00 |
| 2019/0202249 A1 * | 7/2019 | Adachi | B61G 1/32 |
| 2022/0176572 A1 * | 6/2022 | Gross | B25J 15/0475 |

FOREIGN PATENT DOCUMENTS

WO    WO-2016165721 A1 * 10/2016 ............ B25J 11/008

* cited by examiner

*Primary Examiner* — Kevin Hurley
(74) *Attorney, Agent, or Firm* — Finnegan, Henderson, Farabow, Garrett & Dunner, LLP

(57) ABSTRACT

There exists a limitation while designing tugger device with latching area for gaining a specific orientation of a powered vehicle and orientation of unpowered trailers. This disclosure relates generally to an automated carrier tugger mounted on an autonomous mobile robot (AMR) for tugging a carrier. The automated carrier tugger includes a rotary joint unit, a swivel adaptor unit, and a tugging unit for clamping a horizontal bar. The rotary joint unit includes a vertical fixed shaft and plurality of integral pipes are integrated with a pipe mounting plate at one end. The swivel adaptor unit include the pipe mounting plate mounted onto the plurality of integral pipes and a male spherical joint integrated with a swivel adaptor plate. The tugging unit includes a single rear clamp and a plurality of front clamps with a plurality of flanges mounted onto a plurality of horizontal axis slides to move at required direction.

18 Claims, 17 Drawing Sheets

720A-B

AUTOMATED CARRIER TUGGER MOUNTED ON AN AUTONOMOUS MOBILE ROBOT FOR TUGGING A CARRIER

PRIORITY CLAIM

This U.S. patent application claims priority under 35 U.S.C. § 119 to: India Application No. 202021040100, filed on Sep. 16, 2020. The entire contents of the aforementioned application are incorporated herein by reference.

TECHNICAL FIELD

This disclosure relates generally to a robotics system, and, more particularly, to an automated carrier tugger, which includes a rotary joint unit attached with a tugging unit mounted on an autonomous mobile robot (AMR) for tugging a carrier carrying a payload.

BACKGROUND

Industry environment is transforming with traditional warehouses into smart warehouses. Trailers are unpowered vehicles in the warehouse with varied applications of material handling including picking and transport. For example, the varied applications could be bins on wheels, pallets on wheels, carts, trolleys, Racks on wheels, automotive assemblies mounted on wheels. Typical industry practice most commonly observed is to manually attach the unpowered trailer to a powered vehicle. The powered vehicle can be fully autonomous robotic vehicle or semi-automated like automated guided vehicle or manually operated tugger trucks. The fully autonomous robotic type of powered vehicle, wherein the vehicle attaches itself automatically to the unpowered trailer are hardly a few across globe. Further, there are very limited designs existing with lesser functions and mechanisms leading to complex manipulations which lead to complex programming. Further, while designing the hook corresponding with latching area resulting in a design limitation for gaining a specific orientation with respect to the powered vehicle and orientation of the unpowered trailer.

SUMMARY

Embodiments of the present disclosure present technological improvements as solutions to one or more of the above-mentioned technical problems recognized by the inventors in conventional systems. For example, in one embodiment, an automated carrier tugger mounted on an autonomous mobile robot (AMR) for tugging a carrier is provided. The automated carrier tugger includes a rotary joint unit, a swivel adaptor unit, and a tugging unit for clamping a horizontal bar. The rotary joint unit includes a vertical fixed shaft, fixed at two ends; and a plurality of integral pipes, integrated with a pipe mounting plate at one end. On one end is mounted to a base plate, and another end is fixed to a counterweight housing to house a swivel arm. The plurality of integral pipes are designed to be parallel to each other. The pipe mounting plate is perpendicular to a ground before tightening a plurality of screws for a required torque. The swivel adaptor unit includes the pipe mounting plate, which is mounted onto the plurality of integral pipes; and a male spherical joint, integrated with a swivel adaptor plate. The pipe mounting plate and a plurality of split connecting joint plates are joined together to hold a female spherical joint. The swivel adaptor plate is mounted to revolve with the male spherical joint to limit an amount of revolution and the swivel adaptor plate touches the plurality of split connecting joint plates. The tugging unit for clamping the horizontal bar includes a single rear clamp, mounted onto a vertical axis slide; and a plurality of front clamps with a plurality of flanges, mounted onto a plurality of horizontal axis slides to move in a forward direction or a backward direction. The vertical axis slide is mounted to the swivel adaptor plate.

The swivel arm includes the plurality of integral pipes, the pipe mounting plate, and the plurality of integrated semi-cylindrical clamps. The swivel arm rotates on a bearing housing via a plurality of bearing units. The plurality of bearing units are mounted on the vertical fixed shaft. The plurality of integral pipes are integrated with the plurality of bearing units at one end and the pipe mounting plate at another end to form the swivel arm. The swivel arm is integrated with a plurality of tension springs. One side of a tension spring is connected to one side of a shaft gear which is coupled with outer diameter of the bearing unit, and other side of a tension spring is connected to a plurality of stand offs. The plurality of stand offs is mounted onto the base plate.

The swivel arm attached with the tugging unit is free to swivel overcoming a spring force when the AMR is moving in at least one direction. The plurality of tension springs exerts an equal tension force on the plurality of bearing units. The shaft gear is mounted onto the bearing housing. The bearing housing is coupled with the plurality of bearing units. The plurality of integrated semi cylindrical clamps and a plurality of free semi cylindrical clamps are mounted on the bearing housing. A motor and a motor gear are engaged into the shaft gear. The motor operates causing the swivel arm to rotate for attaining a required orientation.

A locking coupling include a mirror teeth profile and a lock engager includes an inverse teeth profile to mesh and provide a load taking lock by without transferring an additional load to the motor. The locking coupling and the lock engager is engaged by a lock engaging actuator and the vertical axis slide. The lock engaging actuator operates in forward or backward direction to pivot a floating connector about a hinge point. The floating connector actuates the motor along with a motor mounting plate by a sliding contact between the motor mounting plate and the floating connector.

The lock engager moves in a forward direction by the lock engaging actuator to lock the swivel arm at a particular angle. A point P on the motor gear and a point Q on the shaft gear is not connected when a point A on the lock engager is locked with a point B on the locking coupling. The lock engager moves in a backward direction by the lock engaging actuator to enable the motor to rotate the swivel arm at a required angle. The point A on the lock engager and the point B on the locking coupling is not connected when a point P on the motor gear is locked with a point Q on the shaft gear. The lock engaging actuator is at home position to rotate the swivel arm within a required angle during forward movement. The point A on the lock engager is not connected the point B on the locking coupling. The point P on the motor gear is not connected with the point Q on the shaft gear.

A position of the swivel arm is positioned at center of the rotary joint unit by the plurality of tension springs attached between the plurality of standoffs and the shaft gear when the tugging unit is at an idle position. The single rear clamp is positioned below the horizontal bar for moving the vertical axis slide upwards and a flange of the single rear clamp to hold a rear face of the horizontal bar of the carrier. The plurality of front clamps with the plurality of flanges moves forward towards the carrier thereby the plurality of flanges contact a front side of the horizontal bar to establish a rigid clamping connection between the carrier and the AMR.

The tugging unit for clamping a vertical rod of the carrier includes a motor actuates causing a left hand (LH) lead screw and a right hand (RH) lead screw to move a left hand (LH) rack gear and a right hand (RH) rack gear at least one desired direction. The LH rack gear and the RH rack gear rotate a plurality of swivel clamps to clamp and de-clamp a vertical rod of the carrier. The LH rack gear and the RH rack gear move inwards to clamp the vertical rod of the carrier. The LH rack gear and the RH rack gear move outwards to de-clamp the vertical rod of the carrier. A plurality of rod butting elements locates the vertical rod and supports tugging of the carrier.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
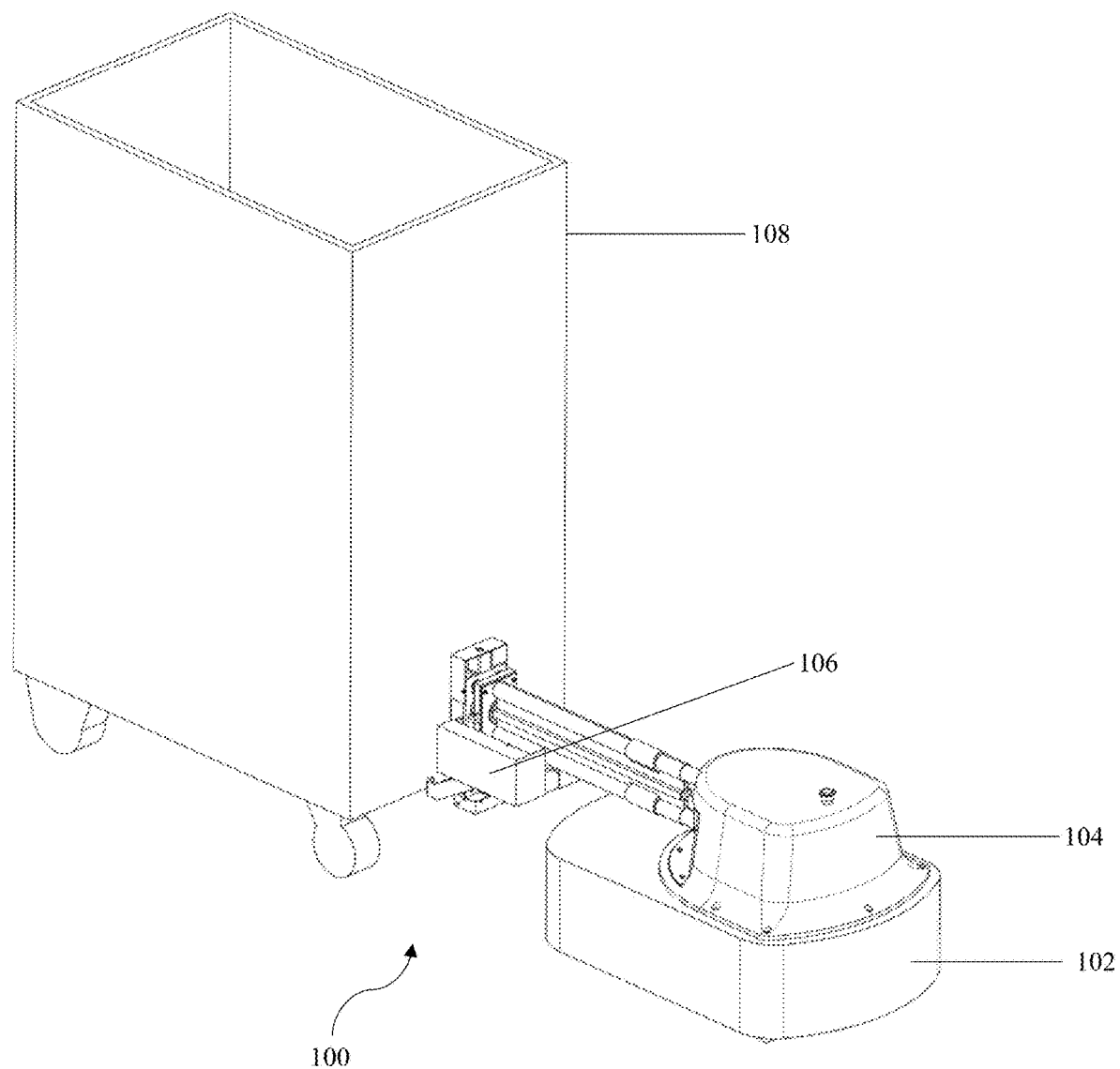
FIG. 1 is an isometric view depicting a rotary joint unit attached with a tugging unit mounted onto an autonomous mobile robot (AMR) which tugs a carrier, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments of the present disclosure provide an automated carrier tugger is designed for tugging a carrier carrying a payload at warehouses and logistics areas. The automated carrier tugger consists of a rotary joint unit attached with a tugging unit. The automated carrier tugger is mounted on to an autonomous mobile robot (AMR) or an automated guided vehicle (AGV). The automated carrier tugger is designed for tugging one or more carriers carrying one or more payloads. For example, one or more carriers are a cart, a pallet carrier on wheels, a roller cage, a rack on wheels. The tugging unit is designed to clamp one or more carriers in a one or more positions i.e. a horizontal bar and a vertical rod.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

Reference numerals of one or more components of an automated carrier tugger, which includes the rotary joint unit attached with the tugging unit mounted on the autonomous mobile robot (AMR) for tugging the carrier as depicted in the FIGS. 1 through 9 are provided in Table 1 below for ease of description.

TABLE 1

| S. NO | NAME OF COMPONENT | REFERENCE NUMERALS |
|---|---|---|
| 1 | Carrier tugger | 100 |
| 2 | Autonomous Mobile Robot (AMR)/Automated guided vehicle (AGV) | 102 |
| 3 | Rotary joint Unit | 104 |
| 4 | Tugging unit | 106 |
| 5 | Carrier | 108 |
| 6 | Counterweight casting | 202 |
| 7 | Swivel arm | 204 |
| 8 | Plurality of protective covers | 206A-C |
| 9 | Plurality of rubber pads | 208A-B |
| 10 | Emergency switch | 210 |
| 11 | Plurality of integral pipes | 212A-B |
| 12 | Base plate | 214 |
| 13 | Vertical fixed shaft | 216 |
| 14 | Lock engaging actuator | 218 |
| 15 | Encoder | 220 |

TABLE 1-continued

| S. NO | NAME OF COMPONENT | REFERENCE NUMERALS |
|---|---|---|
| 16 | Plurality of bumpers | 222A-B |
| 17 | Plurality of integrated semi-cylindrical clamps | 224A-B |
| 18 | Pipe mounting plate | 226 |
| 19 | Plurality of free semi cylindrical clamps | 228A-B |
| 20 | Lock engager | 230 |
| 21 | Locking coupling | 232 |
| 22 | Plurality of tension springs | 234A-B |
| 23 | Mounting Bracket | 236 |
| 24 | Plurality of stand offs | 238A-B |
| 25 | Male spherical joint | 302 |
| 26 | Female spherical joint | 304 |
| 27 | Plurality of compression springs | 306A-D |
| 28 | Plurality of split connecting joint plates | 308A-B |
| 29 | Motor for locking mechanism | 310 |
| 30 | Swivel adaptor plate | 312 |
| 31 | Plurality of bearing units | 314A-B |
| 32 | Hinge point for floating connector | 316 |
| 33 | Motor gear | 318 |
| 34 | Bearing housing | 320 |
| 35 | Spacer | 322 |
| 36 | Shaft gear | 324 |
| 37 | Motor mounting plate | 402 |
| 38 | L Bracket | 404 |
| 39 | Floating connector | 406 |
| 40 | Hinge pin | 408 |
| 41 | Motor hinge point | 410 |
| 42 | Vertical drive unit | 502 |
| 43 | Vertical axis slide | 504 |
| 44 | Vertical drive motor | 506 |
| 45 | Horizontal drive unit | 508 |
| 46 | Horizontal drive motor | 510 |
| 47 | Plurality of horizontal axis slides | 512A-B |
| 48 | Opening bend | 514 |
| 49 | Camera | 516 |
| 50 | Single rear clamp | 518 |
| 51 | Plurality of front clamp plates | 520A-B |
| 52 | Plurality of gears | 522A-B |
| 53 | Plurality of flanges | 524A-B |
| 54 | Horizontal bar of a cart | 602 |
| 55 | Motor for vertical rod hooking mechanism | 702 |
| 56 | Plurality of pinion gears | 704A-D |
| 57 | Left hand (LH) and right hand (RH) Lead screw | 706 |
| 58 | Mounting plate for the spherical joint | 708 |
| 59 | Left hand (LH) rack gear | 710A |
| 60 | Right hand (RH) rack gear | 710B |
| 61 | Plurality of mounting blocks | 712A-D |
| 62 | Plurality of swivel clamps | 714A-D |
| 63 | Plurality of gear shafts | 716A-D |
| 64 | Housing for vertical rod hooking mechanism | 718 |
| 65 | Plurality of Rod butting elements | 720A-B |
| 66 | Vertical rod | 802 |

Figure 2A:
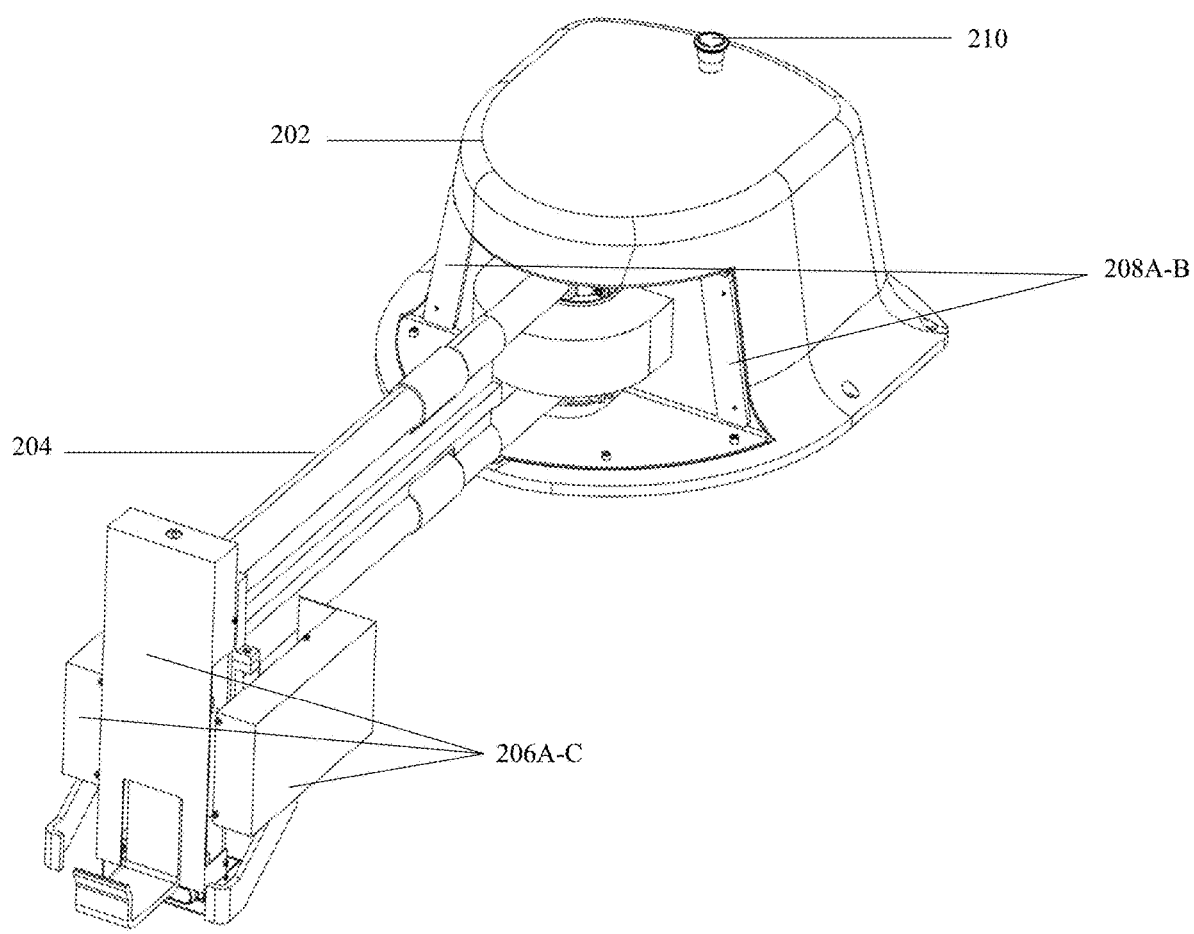
FIGS. 2A-2C are isometric views of the rotary joint unit attached with the tugging unit, according to some embodiments of the present disclosure.
Figure 2B:
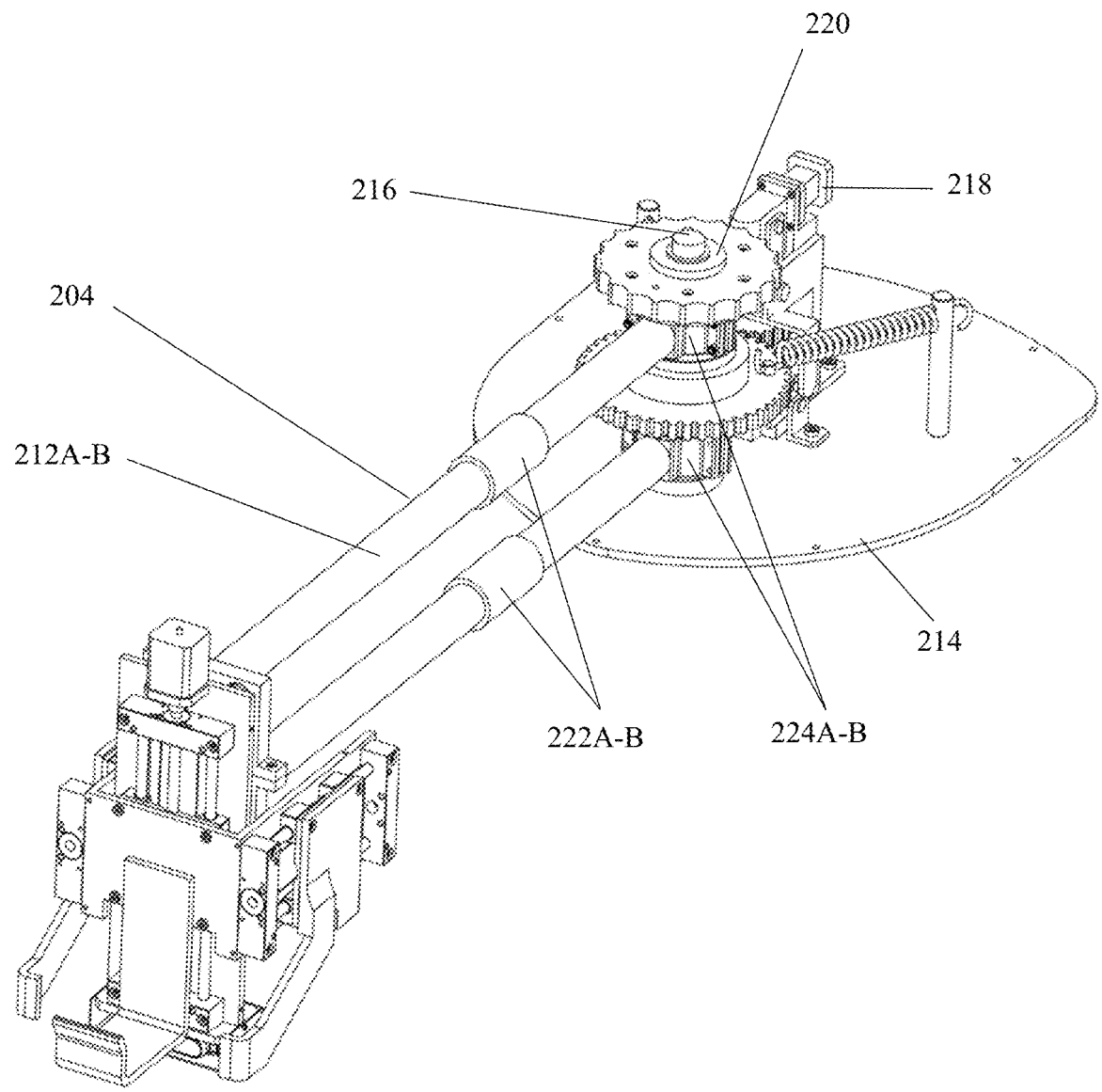
Figure 2C:
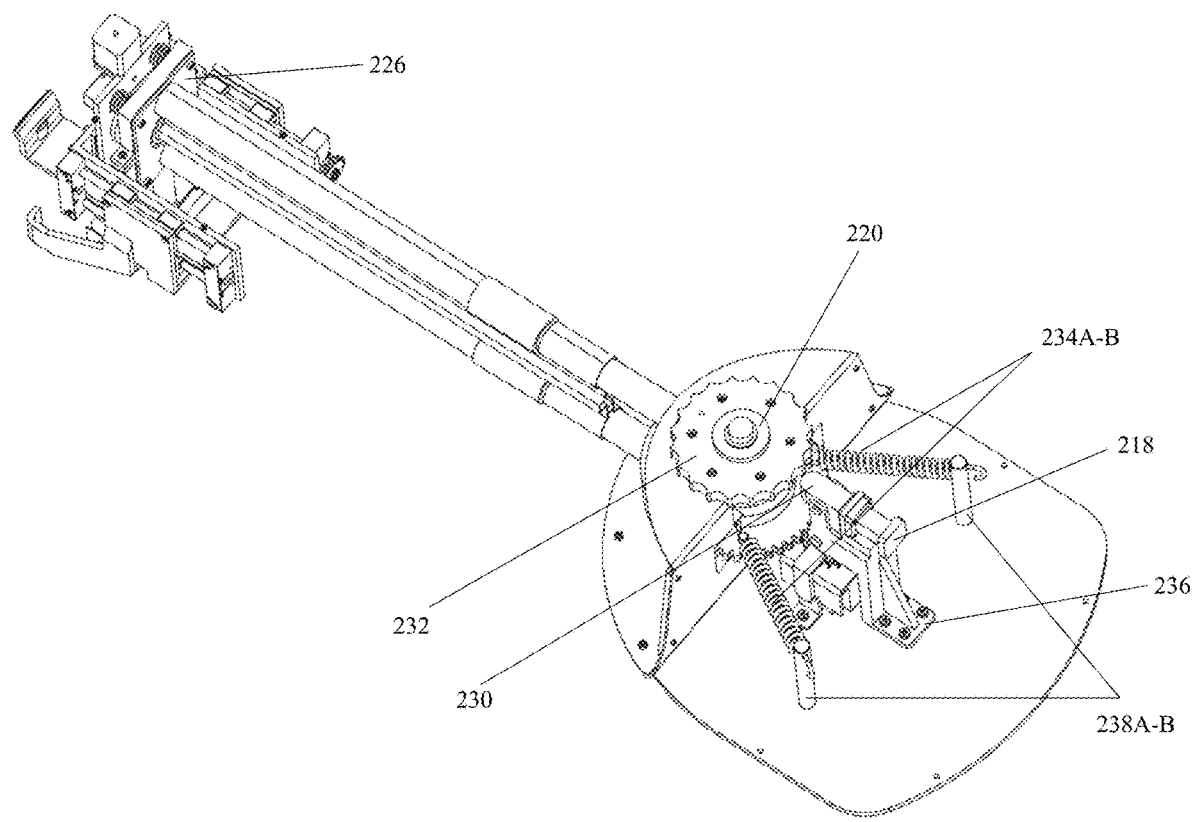
Figure 3A:
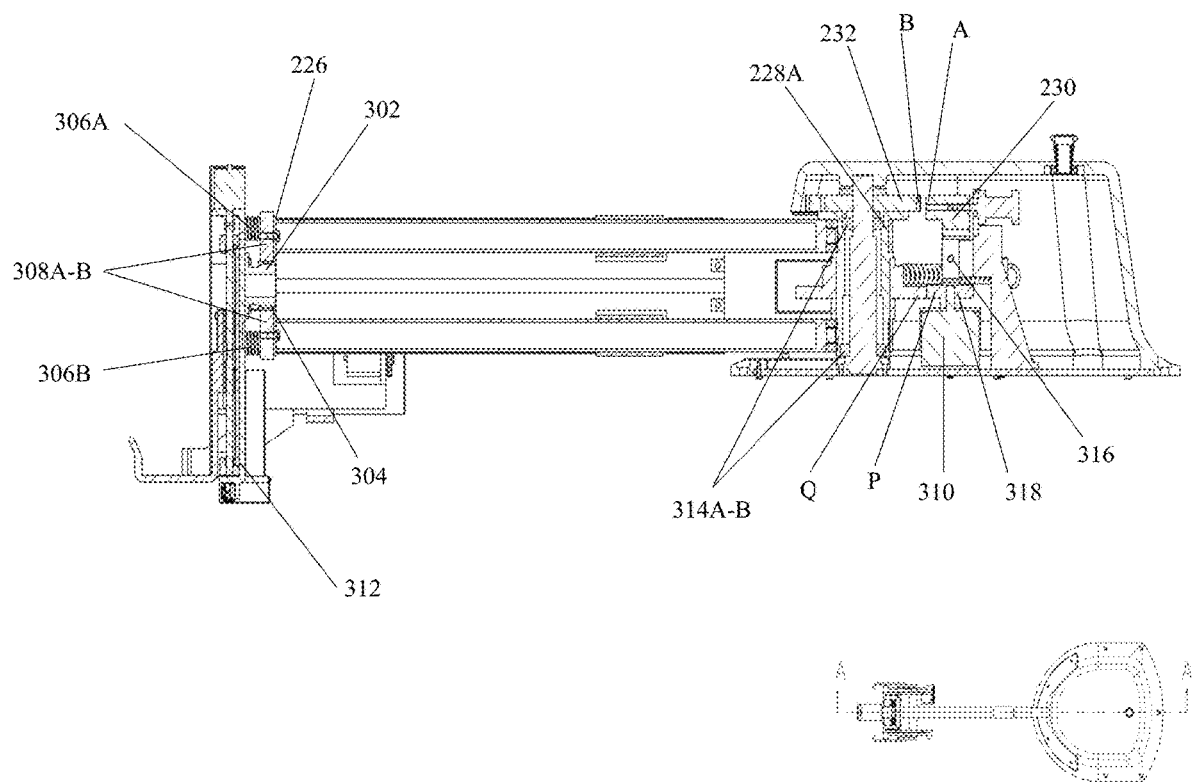
FIG. 3A is a sectional view of the rotary joint unit attached with the tugging unit, according to some embodiments of the present disclosure.
Figure 6:
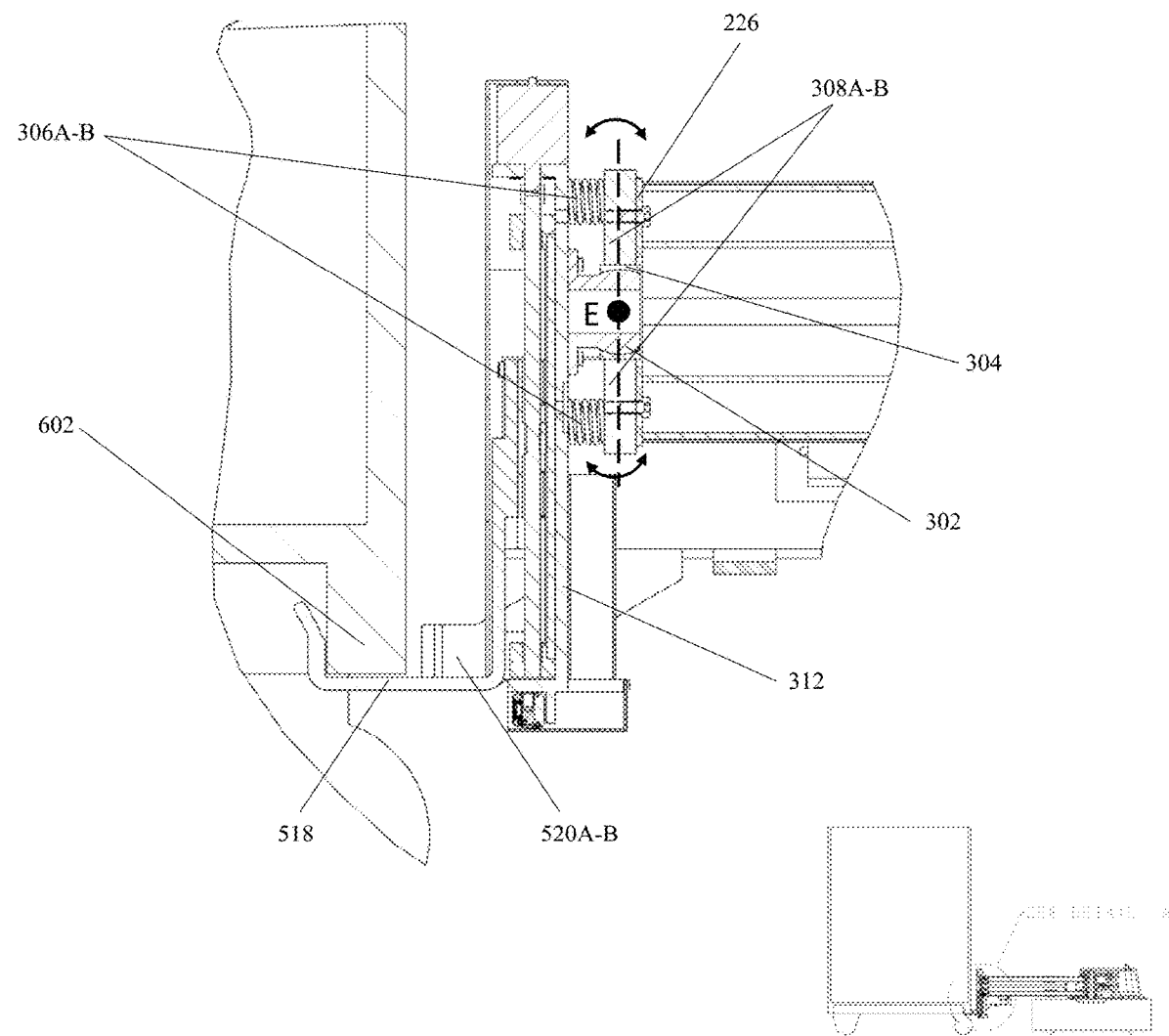
FIG. 6 is a detailed sectional view of a hook and plurality of spherical joints of the tugging unit, according to some embodiments of the present disclosure.

FIG. 1 is an isometric view depicting the rotary joint unit 104 attached with the tugging unit 106 mounted onto the autonomous mobile robot (AMR) 102 which tugs the carrier 108, according to some embodiments of the present disclosure. FIGS. 2A-2C are isometric views of the rotary joint unit 104 attached with the tugging unit 106, according to some embodiments of the present disclosure. FIG. 3A is a sectional view of the rotary joint unit 104 attached with the tugging unit 106, according to some embodiments of the present disclosure. An automated carrier tugger 100 includes the rotary joint unit 104 attached with the tugging unit 106 mounted onto the AMR 102 which tugs the carrier 108. In an embodiment, the automated carrier tugger 100 is interchangeably referred as a tugger 100. In an embodiment, the automated carrier tugger 100 is designed for tugging one or more type carriers carrying one or more types of payload. In at least one embodiment, the carrier 108 may corresponds to one or more trailers e.g., cart, pallet carrier on wheels, roller cage, rack on wheels. The automated carrier tugger 100 is mounted on the autonomous mobile robot (AMR) 102 for tugging the carrier 108. The automated carrier tugger 100 includes the rotary joint unit 104, a swivel adaptor unit, and the tugging unit 106 for clamping the horizontal bar 602 (as depicted in FIG. 6) of the carrier 108. The rotary joint unit 104 includes the vertical fixed shaft 216, which is fixed at two ends. One end is mounted to a base plate 214, and another end is fixed to a counterweight housing 202 to house a swivel arm 204. The plurality of integral pipes 212A-B are integrated with the pipe mounting plate 226 at one end. The plurality of integral pipes 212A-B are designed to be parallel to each other. The pipe mounting plate 226 is perpendicular to a ground before tightening a plurality of screws for a required torque.

Figure 5A:
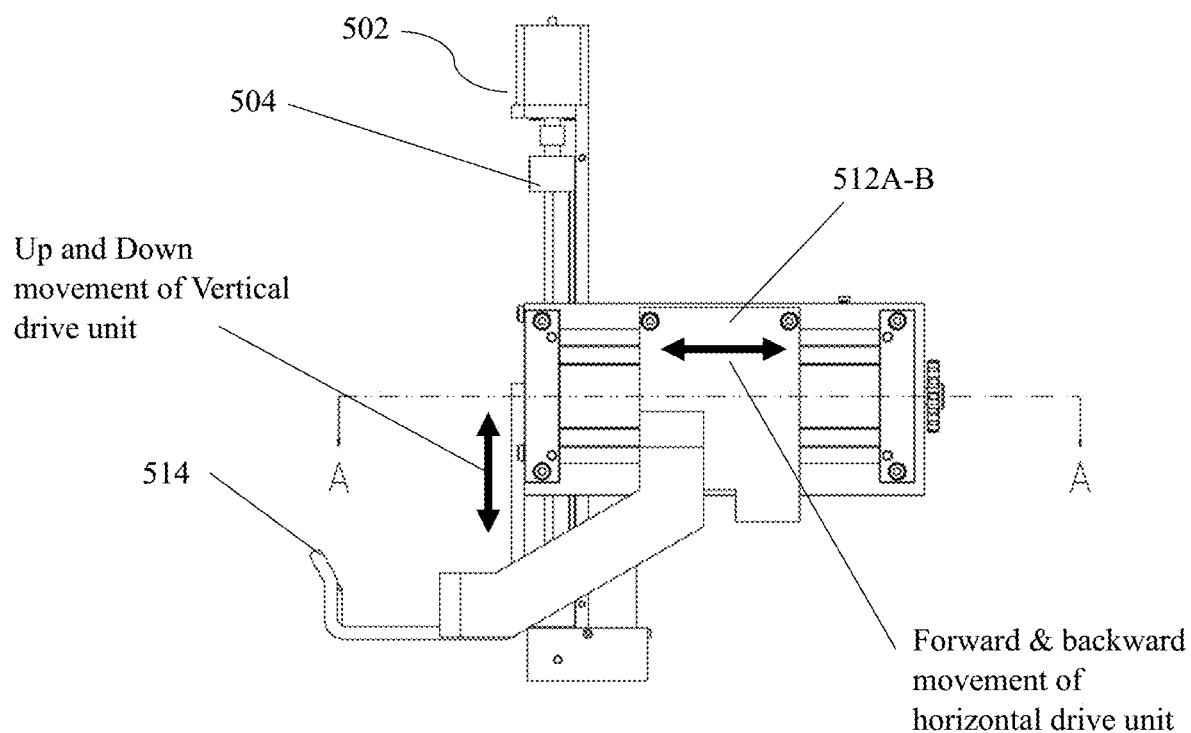
FIG. 5A is a right side view of the tugging unit to clamp a horizontal bar of the carrier, according to some embodiments of the present disclosure.
Figure 5B:
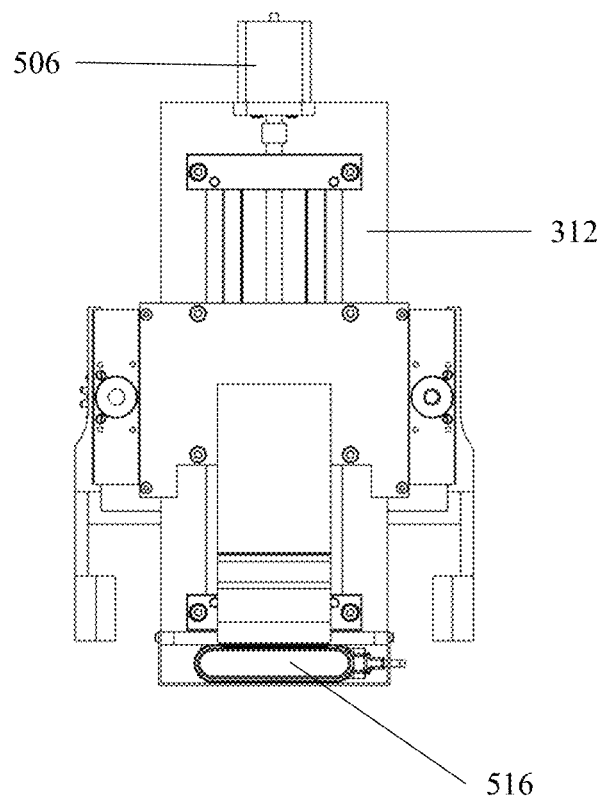
FIG. 5B is a front view of the tugging unit to clamp the horizontal bar of the carrier, according to some embodiments of the present disclosure.
Figure 5C:
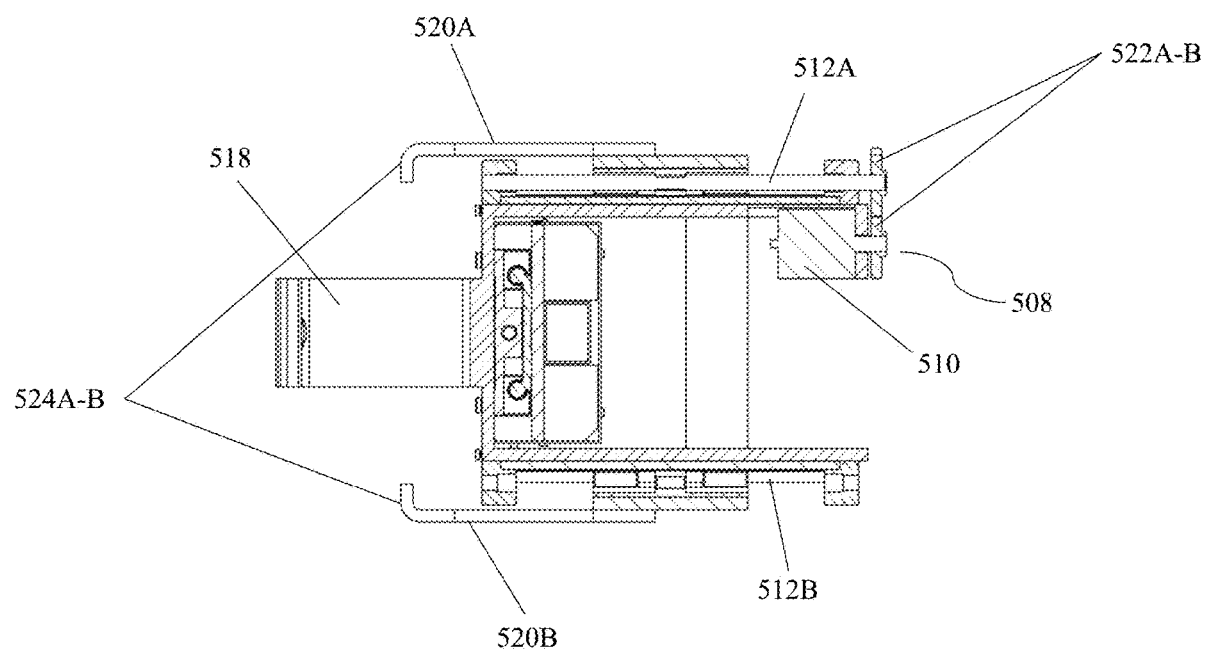
FIG. 5C is a top sectional view of the tugging unit to clamp the horizontal bar of the carrier, according to some embodiments of the present disclosure.

The swivel adaptor unit includes the pipe mounting plate 226 which is mounted onto the plurality of integral pipes 212A-B. The pipe mounting plate 226 and the plurality of split connecting joint plates 308A-B joined to hold the female spherical joint 304. The male spherical joint 302 is integrated with the swivel adaptor plate 312. The swivel adaptor plate 312 is mounted to revolve with the male spherical joint 302 to limit an amount of revolution and the swivel adaptor plate 312 touches the plurality of split connecting joint plates 308A-B. The tugging unit 106 for clamping the horizontal bar 602 of the carrier 108 includes the single rear clamp 518 (as depicted in FIG. 5C) is mounted onto a vertical axis slide 504. The vertical axis slide 504 (as depicted in FIG. 5A) is mounted to the swivel adaptor plate 312. The plurality of front clamps 520A-B (as depicted in FIG. 5C) with the plurality of flanges 524A-B (as depicted in FIG. 5C) is mounted onto the plurality of horizontal axis slides 512A-B (as depicted in FIG. 5C) to move in a forward direction or a backward direction.

Figure 3B:
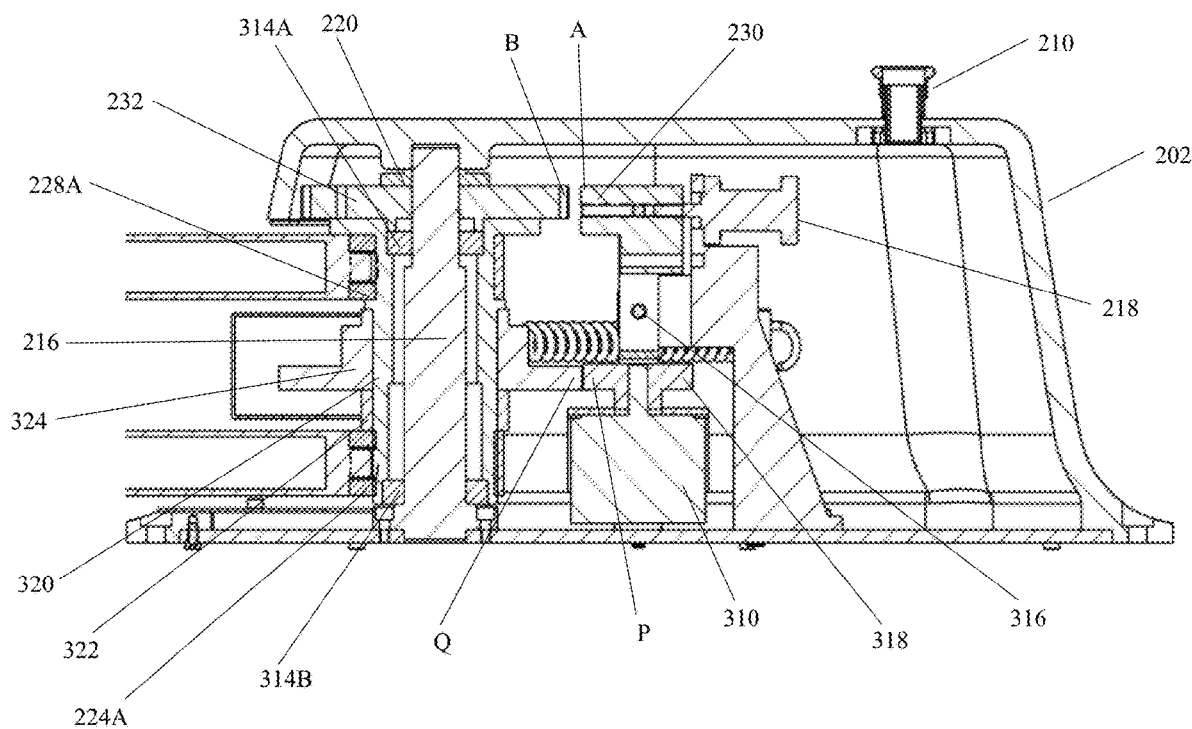
FIG. 3B is a detailed sectional view of the rotary joint unit, according to some embodiments of the present disclosure.
Figure 4A:
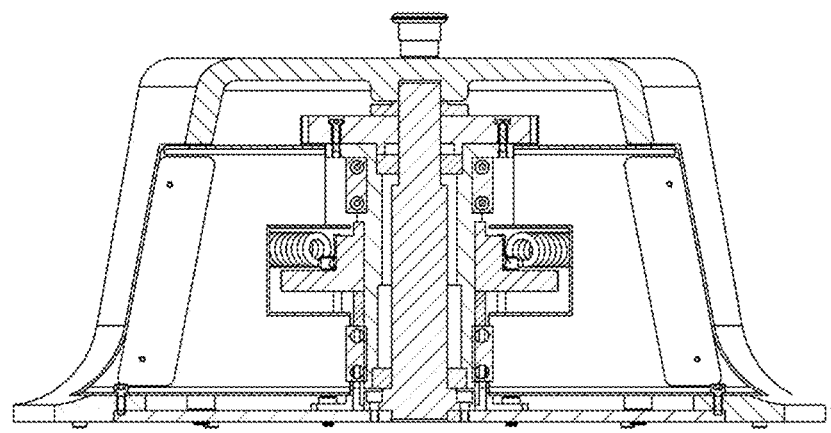
FIGS. 4A-4B are sectional views of the rotary joint unit, according to some embodiments of the present disclosure.
Figure 4B:
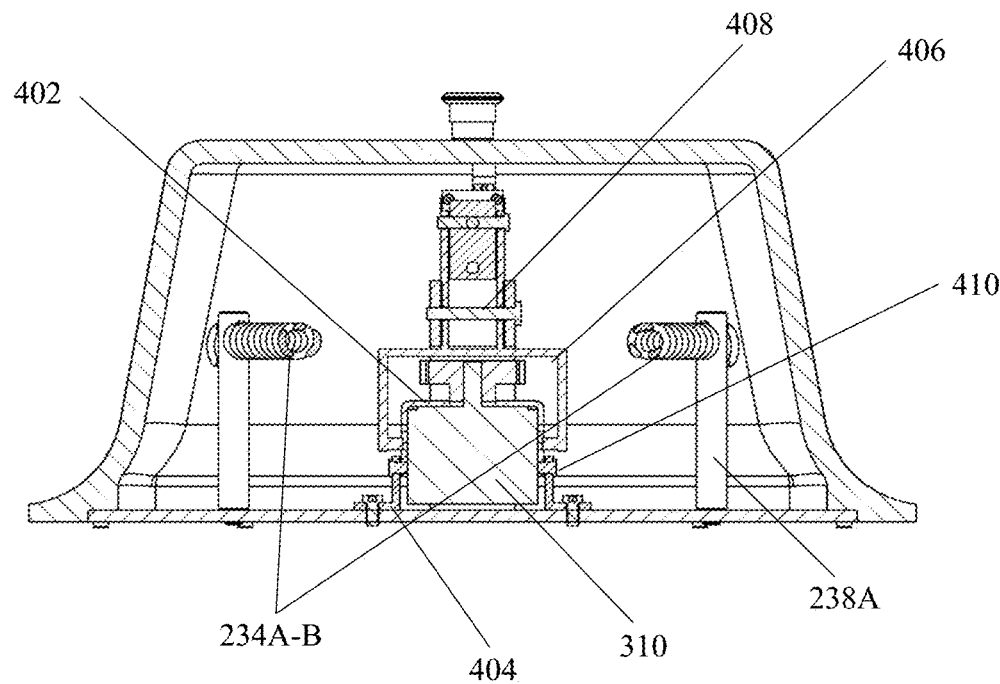

FIG. 3B is a detailed sectional view of the rotary joint unit 104, according to some embodiments of the present disclosure. FIGS. 4A-4B are sectional views of the rotary joint unit 104, according to some embodiments of the present disclosure. The rotary joint unit 104 includes the base plate 214 mounted on the AMR 102 on which one or more parts are being mounted. The vertical fixed shaft 216 also referred as the rotary axis for the swivel arm 204 to perform the tugging mechanism. The swivel arm 204 include the plurality of integral pipes 212A-B, the pipe mounting plate 226, and the plurality of integrated semi-cylindrical clamps 224A-B. The swivel arm 204 rotates on the bearing housing 320 by the plurality of bearing units 314A-B. The plurality of bearing units 314A-B is mounted on the vertical fixed shaft 216. The plurality of integral pipes 212A-B integrated with the plurality of bearing units 314A-B at one end and the pipe mounting plate 226 integrated at another end to form the swivel arm 204.

In an embodiment, one end of vertical fixed shaft 216 is located by a hole provided on the base plate 214 and mounted over the base plate 214 at a bottom point by one or more fasteners. In an embodiment, another end of the vertical fixed shaft 216 is located at top of the counterweight casting 202 and additionally supported by the plurality of bearing units 314A-B mounted on the bearing housing 320. There are two main elements are mounted to the bearing housing 320 i.e., the shaft gear 324 and the locking coupling 232. The shaft gear 324 is mounted by the spacer 322 and the locking coupling 232 is located and mounted on top of the bearing housing 320. Additionally, the swivel arm 204 is also mounted using the plurality of semi cylindrical clamps 224A-B. The bottom and top end of the bearing housing 320 is engaged by the plurality of bearing units 314A-B. In an embodiment, the shaft gear 324 is also located by the bearing housing 320 and mounted on the spacer 322. The plurality of tension springs 234A-B mounted on either side of the shaft gear 324.

The swivel arm 204 is integrated with the plurality of tension springs 234A-B. In an embodiment, on one side of the tension spring 234A is connected to one side of the shaft gear 324 which is coupled with outer diameter of the bearing unit 314A, and other side of the tension spring 234B is connected to the plurality of stand offs 238A-B. The plurality of stand offs 238A-B is mounted onto the base plate 214. The swivel arm 204 is attached with the tugging unit 106 is free to swivel overcoming a spring force when the AMR 102 is moving in at least one direction. The plurality of tension springs 234A-B exerts an equal tension force on the plurality of bearing units 314A-B. The shaft gear 324 is mounted onto the bearing housing 320. The bearing housing 320 is coupled with the plurality of bearing units 314A-B. The plurality of integrated semi cylindrical clamps 224A-B and the plurality of free semi cylindrical clamps 228A-B are mounted on the bearing housing 320. In an embodiment, one end of the plurality of tension springs 234A-B is connected to the shaft gear 324 and another end is connected to the plurality of stand offs 238A-B.

In an embodiment, whole swiveling arm assembly are aligned in center with the AMR 102 by the plurality of tension springs 234A-B when both the shaft gear 324 and the lock coupling 232 are freely rotating on the bearing housing 320 and concentric with the vertical fixed shaft 216. The rotary joint unit 104 consists of the mounting bracket 236 which is mounted to the base plate 214 by one or more screws for locking mechanism. The lock engaging actuator 218 with the lock engager 230 is mounted to the mounting bracket 236. A position of the swivel arm 204 is positioned at center of the rotary joint unit 104 by the plurality of tension springs 234A-B attached between the plurality of standoffs 238A-B and the shaft gear 324 when the tugging unit 106 is at an idle position.

The floating connector 406 hinges about the hinge point 316 i.e., a bottom point of the floating connector 406 include two pins which are sliding inside one or more slots provided in the motor mounting plate 402, a middle point of the floating connector 406 is connected to the hinge pin 408, and at top point of the floating connector 406 is connected to the lock engager 230. In an embodiment, the motor 310 with the motor mounting plate 402 also include two pin holes and pivoted at both sides of the motor 310 with two pins and the L bracket 404. The two pin holes and the two pins actuate the motor 310 to swivel about the two pin holes through the floating connector 406 as the lock engager 230 operated by the lock engaging actuator 218.

In an embodiment, as the lock engaging actuator 218 is connected to the lock engager 230, and the floating connector 406 connects between the lock engager 230 and the motor mounting plate 402 at bottom end. The motor 310 and the motor gear 318 are engaged into the shaft gear 324. The motor 310 causing the swivel arm 204 to rotate for attaining a required orientation. The locking coupling 232 includes a mirror teeth profile and the lock engager 230 includes an inverse teeth profile to mesh and provide a load taking lock by without transferring an additional load to the motor 310.

The locking coupling 232 and the lock engager 230 is engaged by the lock engaging actuator 218 and the vertical axis slide 504. The floating connector 406 is pivoted about the hinge point 316 when the lock engaging actuator 218 operates in forward or backward direction. The floating connector 406 actuates the motor 310 along with the motor mounting plate 402 by a sliding contact between the motor mounting plate 402 and the floating connector 406.

The lock engager 230 moves in a forward direction by the lock engaging actuator 218 to lock the swivel arm 204 at a particular angle. A point P on the motor gear 318 and a point Q on the shaft gear 324 is not connected when a point A on the lock engager 230 is locked with a point B on the locking coupling 232. The lock engager 230 moves in a backward direction by the lock engaging actuator 218 to enable the motor 310 to rotate the swivel arm 204 at a required angle. The point A on the lock engager 230 and the point B on the locking coupling 232 is not connected when a point P on the motor gear 318 is locked with a point Q on the shaft gear 324. In an embodiment, to orient the swivel arm 204 and to engage with the carrier 108 when maneuvering space is limited and the AMR 102 is unable to orient parallel to the carrier 108, then the AMR 102 may rotate to some extent while the swivel arm 204 to pick the carrier 108. The lock engaging actuator 218 is at home position to rotate the swivel arm 204 within a required angle during forward movement. The point A on the lock engager 230 is not connected the point B on the locking coupling 232. The point P on the motor gear 318 is not connected with the point Q on the shaft gear 324.

In an embodiment, when the lock engaging actuator 218 is at a home position then there are no connections between the points A and B, and P and Q, and the swivel arm assembly are free to rotate and always positioned in center of the AMR 102 with help of the plurality of tension springs (e.g., two tension springs) 234A-B connected between the plurality of standoffs 238A-B and the shaft gear 324. In an embodiment, three positions between AB and PQ are also achieved by using another motor instead of the lock engaging actuator 218. The motor 310 can rotate clockwise or anticlockwise direction operating the lock engager 230 forward or backward direction.

The swivel arm 204 consists of at least two pipes of which one end is mounted to the pipe mounting plate 226 and another end is connected to the vertical fixed shaft 216 with help of the plurality of semi cylindrical clamps 224A-B. In an embodiment, two bumpers mounted to the two pipes of the swivel arm 204 which provides a damping action for entire swivel arm assembly during rotation of arm assembly itself to prevent a sudden hitting of the arm assembly with the counterweight casting 202. In an embodiment, rubber pads are attached on either side of the counterweight casting 202 which combinedly provides a cushioning effect in between the swivel arm assembly and the counterweight casting 202. In an embodiment, other end of the swivel arm assembly, the pipe mounting plate 226 is mounted, additionally the plurality of split connecting joint plates (e.g., two split connecting joint plates) 308A-B are also mounted to the pipe mounting plate 226.

The plurality of spherical joints and the plurality of compression springs (e.g., four compression springs) 306A-D are connected in between the pipe mounting plate 226 and the swivel adaptor plate 312. In an embodiment, the plurality of compression springs may alternatively replace with but not limited to a plurality of wave springs, and a plurality of disc springs. In an embodiment, the plurality of spherical joints corresponds to the male spherical joint 302 and the female spherical joint 304. The swivel adaptor plate 312 is mounted free to revolve with the plurality of spherical joints caused by one or more spherical bearings, but at the same time restricted to limit an amount of revolution such that at maximum limits the swivel adaptor plate 312 touches the plurality of split connecting joint plates 308A-B. In an embodiment, while climbing a ramp, the two compression springs 306A-B at top position can compress more and the two compression springs 306C-D at bottom position can expand from a more compressed to a less compressed state. In an embodiment, while moving on an even floor without ramps, small bumps, the plurality of compression springs 306A-D compress equally to bring to an equilibrium. In an embodiment, while moving down the ramp, at situation when the AMR 102 has already climbed down and on the even floor and the carrier 108 is still climbing down, the two compression springs 306A-B at the top position come to a compress less condition from a compress more condition and the two compression springs 306C-D at bottom position compress more.

The encoder 220 is mounted above the locking coupling 232 which helps the rotary joint unit 104 to rotate the swivel arm 204 at a required angle. In an embodiment, the rotary joint unit 104 is covered by the counterweight casting 202. In an embodiment, the counterweight casting 202 acts as an enclosure to the rotary joint unit 104. The emergency switch 210 is mounted onto the counterweight casting 202 which is easily accessible during emergency to stop the rotary joint unit 104. The male spherical joint 302 and the female spherical joint 304 together formed as a spherical bearing mounted in between the pipe mounting plate 226 and the swivel adaptor plate 312. The male spherical joint 302 and the female spherical joint 304 are held together by the plurality of split connecting joint plates 308A-B. The plurality of split connecting joint plates 308A-B are screwed to the pipe mounting plate 226 by a plurality of fasteners. One end of the male spherical joint 302 is screwed to the swivel adaptor plate 312 and another spherical end is inserted into the female spherical joint 304 to provide a spherical action for the swivel adaptor plate 312 in turn to tugging mechanism. In an embodiment, the spherical action is controlled by the plurality of compression springs 306A-D connected in between the pipe mounting plate 226 and the swivel adaptor plate 312. The rotary joint unit 104 with the swivel adaptor plate 312 is swivel about a point E.

FIG. 5A is a right view of the tugging unit 106 to clamp the horizontal bar 602 of the carrier 108, according to some embodiments of the present disclosure. FIG. 5B is a front view of the tugging unit 106 to clamp the horizontal bar 602 of the carrier 108, according to some embodiments of the present disclosure. FIG. 5C is a top sectional view of the tugging unit 106 to clamp the horizontal bar 602 of the carrier 108, according to some embodiments of the present disclosure. FIG. 6 is a detailed sectional view of the hook and the plurality of spherical joints of the tugging unit 106, according to some embodiments of the present disclosure. The swivel adaptor plate 312 mainly consists of two drive units i.e., the vertical drive unit 502 and the horizontal drive unit 508. The vertical drive motor 506 slides the single rear clamp 518 and the horizontal drive unit 508 up and down direction over a vertical axis and further the horizontal drive motor 508 provides forward and backward movement for the plurality of front clamps 520A-B with the plurality of two flanges 524A-B through a horizontal axis. The single rear clamp 518 includes the opening bend 514 is designed to support tugging a square bar or any other profile. For example, when the AMR 102 with the tugging unit 106 goes underneath the carrier 108 to be tugged the single rear clamp 518 is moved up or down according to a height required for hook to tug the horizontal bar 602 of the carrier 108 from bottom and rear side.

The opening bend 514 helps the tugging unit 106 to hold the horizontal bar 602 of the carrier 108 easily. In an embodiment, once the bottom side is idle then the plurality of front clamps 520A-B plate with the plurality of two flanges 524A-B moved towards the horizontal bar 602 of the carrier 108 to hold further from a side face. The plurality of front clamps 520A-B with the plurality of two flanges 524A-B is a single part moved forward and backward over the plurality of the horizontal axis slides 512A-B i.e., a left horizontal axis slide and a right horizontal axis slide and a single drive unit. A camera 516 is mounted at front of the swivel adaptor plate 312 which support in identifying one or more positions of a hooking area and a location of the carrier 108 and provide a constant feedback to navigate the AMR 102 to a desired position during the process of tugging of the horizontal bar 602. The single rear clamp 518 is positioned below the horizontal bar 602 of the carrier 108 for moving the vertical axis slide 504 upwards and a flange of the single rear clamp 518 to hold a rear face of the horizontal bar 602 of the carrier 108. The plurality of front clamps 520A-B with the plurality of flanges 524A-B moves forward towards the carrier 108 thereby the plurality of flanges 524A-B contacts a front side of the horizontal bar 602 of the carrier 108 to establish a rigid clamping connection between the carrier 108 and the AMR 102.

Figure 7A:
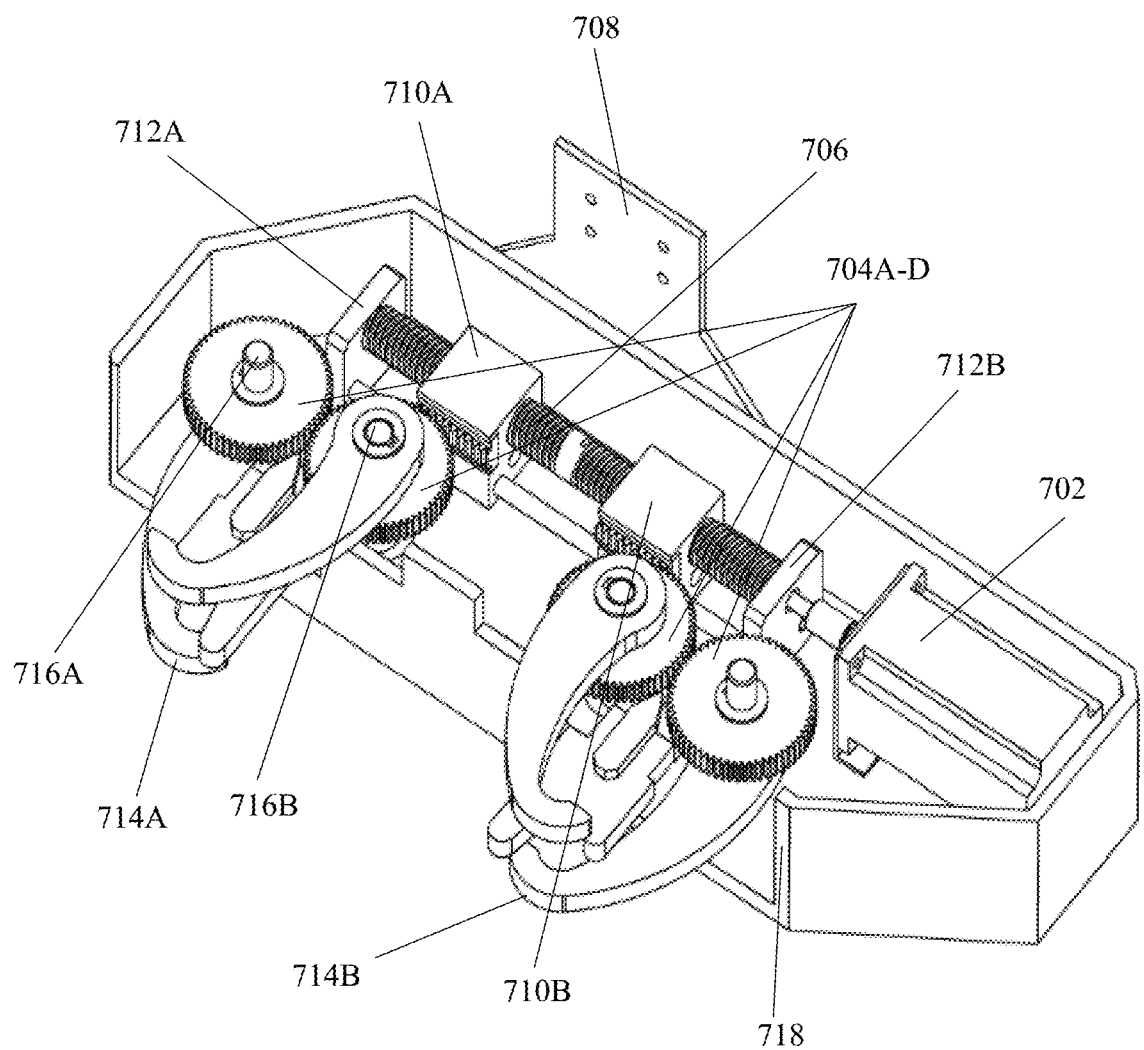
FIG. 7A is an isometric view of an exemplary tugging unit to clamp a vertical rod of the carrier at closed position, according to some embodiments of the present disclosure.
Figure 7B:
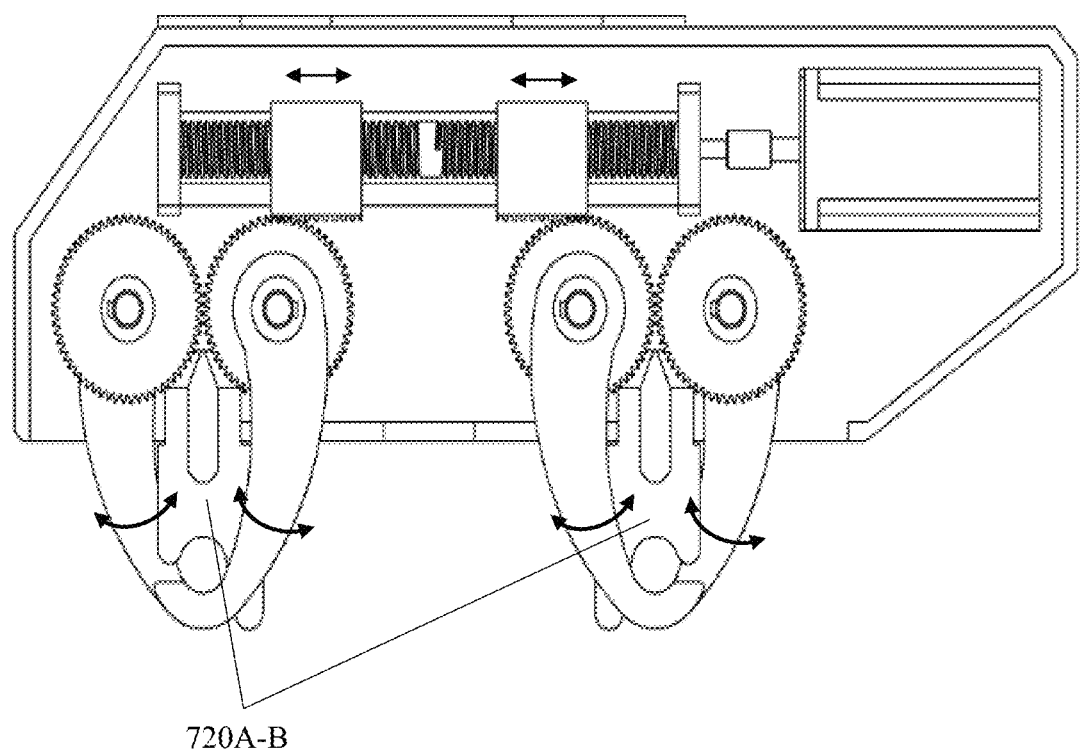
FIG. 7B is a top view of the exemplary tugging unit to clamp the vertical rod of the carrier at the closed position, according to some embodiments of the present disclosure.
Figure 7C:
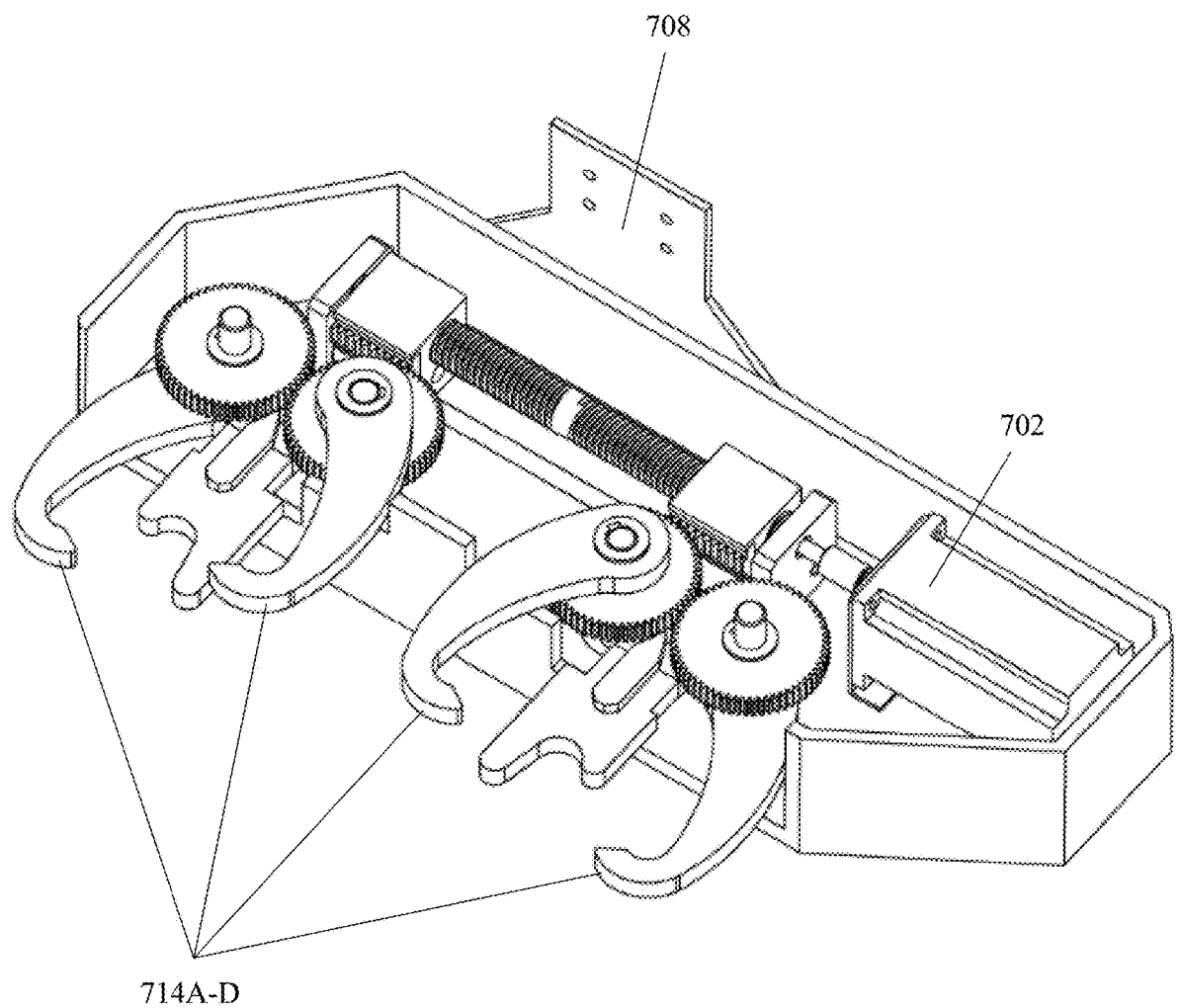
FIG. 7C is an isometric view of the exemplary tugging unit to clamp the vertical rod of the carrier at open position, according to some embodiments of the present disclosure.
Figure 7D:
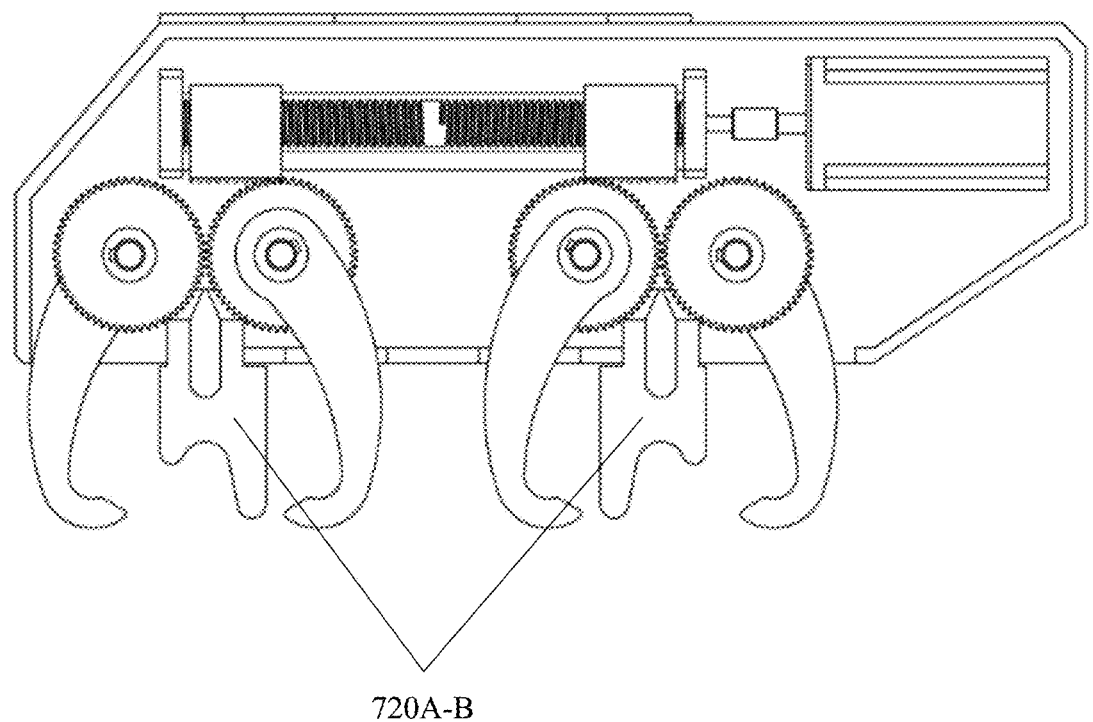
FIG. 7D is a top view of the exemplary tugging unit to clamp the vertical rod of the carrier at the open position, according to some embodiments of the present disclosure.
Figure 8:
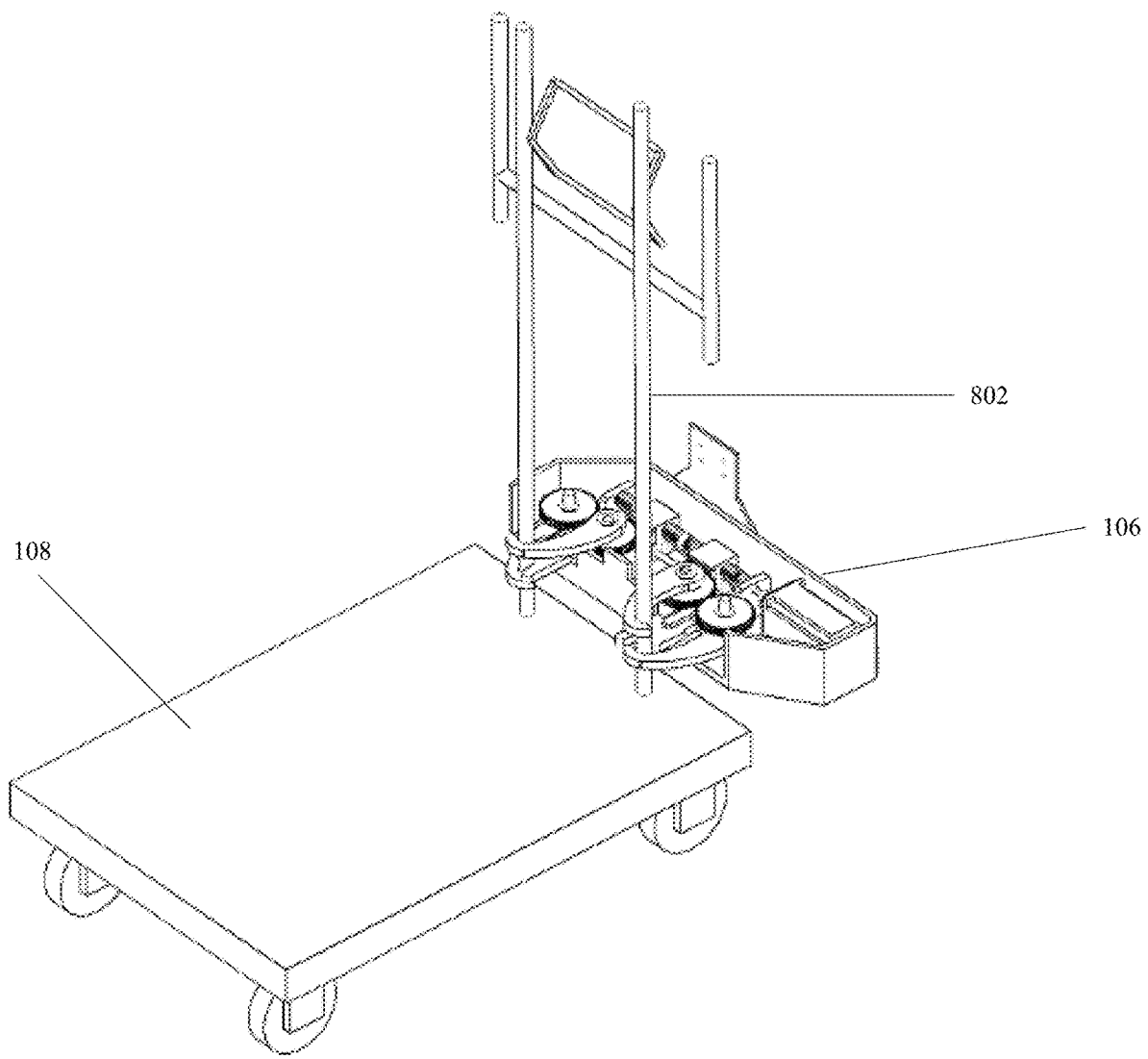
FIG. 8 is an exemplary isometric view of the tugging unit which clamps the vertical rod of the carrier, according to some embodiments of the present disclosure.

FIG. 7A is an isometric view of an exemplary tugging unit 106 to clamp the vertical rod 802 of the carrier 108 at closed position, according to some embodiments of the present disclosure. FIG. 7B is a top view of the exemplary tugging unit 106 to clamp the vertical rod 802 of the carrier 108 at the closed position, according to some embodiments of the present disclosure. FIG. 7C is an isometric view of the exemplary tugging unit 106 to clamp the vertical rod 802 of the carrier 108 at open position, according to some embodiments of the present disclosure. FIG. 7D is a top view of the exemplary tugging unit 106 to clamp the vertical rod 802 of the carrier 108 at the open position, according to some embodiments of the present disclosure. FIG. 8 is an exemplary isometric view of the tugging unit 106 which clamps the vertical rod 802 of the carrier 108, according to some embodiments of the present disclosure.

The tugging unit 106 consists of the housing 718 for vertical rod hooking mechanism, the left hand (LH) lead screw and the right hand (RH) lead screw 706, the plurality of mounting blocks 712A-D, the plurality of rod butting elements 720A-B, the plurality of rack gears 710A-B, the plurality of pinion gears 704A-D and clamps. The LH lead screw and the RH lead screw 706 is mounted to the plurality of mounting blocks 712A-D at two ends and driven by a drive motor at one end. The left hand (LH) rack gear 710A and the right hand (RH) rack gear 710B are driven by the LH lead screw and the RH lead screw 706. The plurality of pinion gears 704A-D are mounted to the plurality of gear shafts 716A-D respectively which is mounted to a housing and pinions are driven by the LH rack gear 710A and the RH rack gear 710B which is travelled over the LH lead screw and the RH lead screw 706. The plurality of pinion gears 704A-D with the plurality of swivel clamps 714A-D are driven by the LH rack gear 710A and the RH rack gear 710B. The LH rack gear 710A and the RH rack gear 710B always moved in a opposite direction. The motor 702 actuates causing the left hand (LH) lead screw and the right hand (RH) lead screw 706 to move the left hand (LH) rack gear 710A and the right hand (RH) rack gear 710B at least one desired direction. The LH rack gear 710A and the RH rack gear 710B rotates the plurality of swivel clamps 714A-D to clamp and de-clamp the vertical rod 802 of the carrier 108. The LH rack gear 710A and the RH rack gear 710B move inwards to clamp the vertical rod 802 of the carrier 108. The LH rack gear 710A and the RH rack gear 7108 move outwards to de-clamp the vertical rod 802 of the carrier 108. The plurality of rod butting elements 720A-B locates the vertical rod 802 and supports tugging of the carrier 108.

Figure 9:
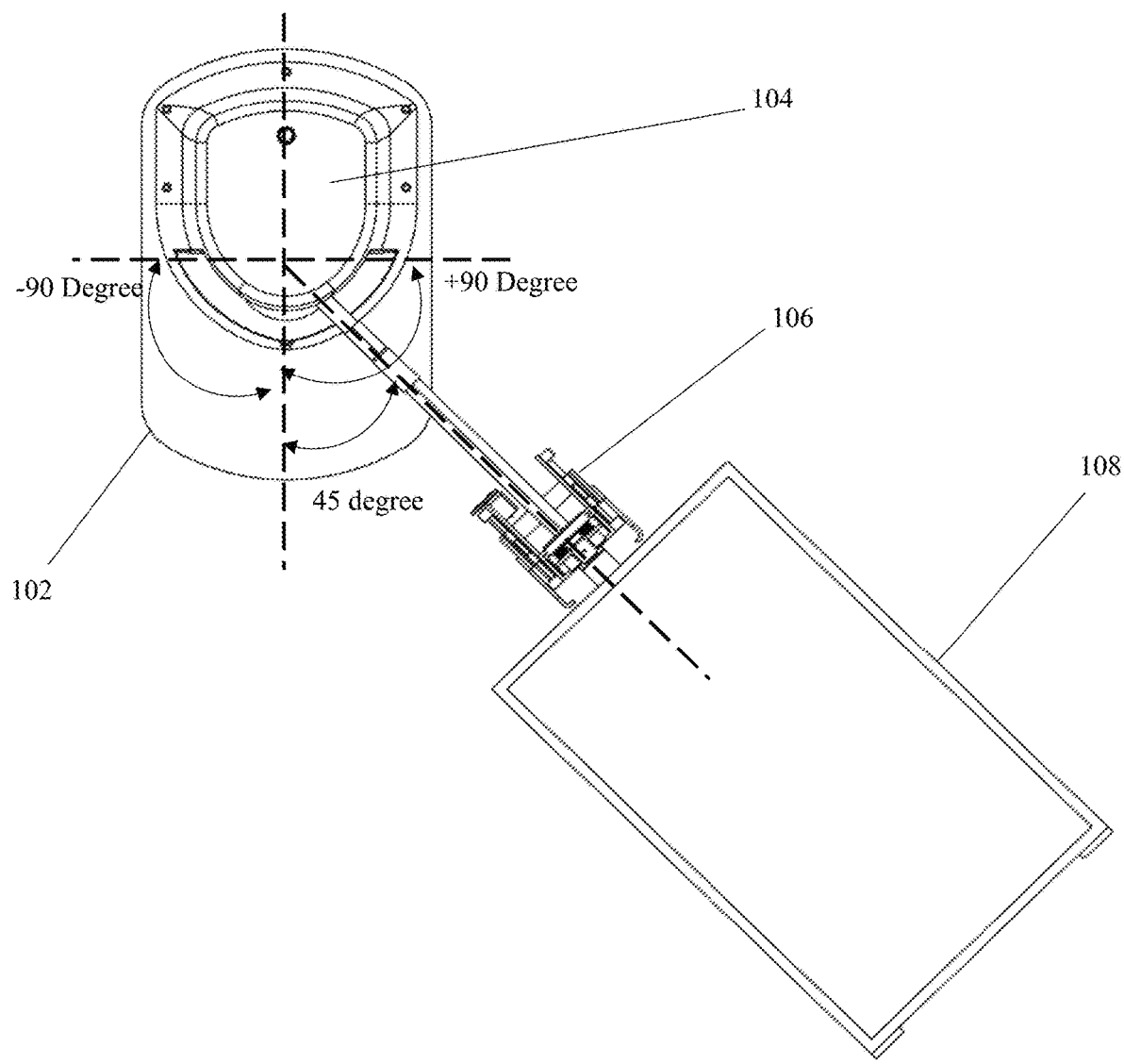
FIG. 9 is an exemplary top view of the rotary joint unit mounted onto the autonomous mobile robot (AMR) attached with the tugging unit which tugs the carrier, according to some embodiments of the present disclosure.

FIG. 9 is an exemplary top view of the rotary joint unit 104 mounted onto the AMR 102 attached with the tugging unit 106 which tugs the carrier 108, according to some embodiments of the present disclosure. The automated carrier tugger is designed with the rotary joint unit 104 mounted onto the AMR 102 attached with the tugging unit 106 which tugs the carrier 108 carrying the payload. In an embodiment, the swivel arm 204 is at an angular orientation in a range of +/−90 deg except 0 deg home position to automatically attach a cart.

The embodiments of present disclosure herein address unresolved problem of one or more complications that arise while designing a tugging unit for better transportation of loads. The embodiments of present disclosure thus provide the automated carrier tugger which is designed with the rotary joint unit attached with the tugging unit mounted onto the autonomous mobile robot (AMR) to tug the carrier. Moreover, the embodiments herein further provide an ability to come back to home position by itself during tugging at same orientation of the carrier and without external power control. The embodiments of present disclosure herein provide the automated carrier tugger which is customizable to work for one or more cart types and programming the design can be easily performed. The automated carrier tugger have an ability to pull roll cage containers with a horizontal bar at below the cart. Also, the automated carrier tugger have an ability to pull roll cage containers with vertical bars in the front of the cart.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:
1. An automated carrier tugger (100) mounted on an autonomous mobile robot (AMR) (102) for tugging a carrier (108), comprising:
    a rotary joint unit (104), comprising:
        a vertical fixed shaft (216), fixed at two ends, wherein one end is mounted to a base plate (214), and another end is fixed to a counterweight housing (202) to house a swivel arm (204); and a plurality of integral pipes (212A-B), integrated with a pipe mounting plate (226) at one end, wherein the plurality of integral pipes (212A-B) are designed to be parallel to each other, wherein the pipe mounting plate (226) is perpendicular to a ground before tightening a plurality of screws for a required torque;

a swivel adaptor unit, comprising:
the pipe mounting plate (226), which is mounted onto the plurality of integral pipes (212A-B), wherein the pipe mounting plate (226) and a plurality of split connecting joint plates (308A-B) are joined to hold a female spherical joint (304); and
a male spherical joint (302), integrated with a swivel adaptor plate (312), wherein the swivel adaptor plate (312) is mounted to revolve with the male spherical joint (302) to limit an amount of revolution and the swivel adaptor plate (312) touches the plurality of split connecting joint plates (308A-B); and a tugging unit (106) for clamping a horizontal bar (602), comprising:
a single rear clamp (518), mounted onto a vertical axis slide (504), wherein the vertical axis slide (504) is mounted to the swivel adaptor plate (312); and
a plurality of front clamps (520A-B) with a plurality of flanges (524A-B), mounted onto a plurality of horizontal axis slides (512A-B) to move in a forward direction or a backward direction.

2. The automated carrier tugger (100) as claimed in claim 1, wherein the swivel arm (204) comprises the plurality of integral pipes (212A-B), the pipe mounting plate (226), and a plurality of integrated semi-cylindrical clamps (224A-B), wherein the swivel arm (204) rotates on a bearing housing (320) via a plurality of bearing units (314A-B), wherein the plurality of bearing units (314A-B) are mounted on the vertical fixed shaft (216).

3. The automated carrier tugger (100) as claimed in claim 2, wherein the plurality of integral pipes (212A-B) are integrated with the plurality of bearing units (314A-B) at one end and the pipe mounting plate (226) at another end to form the swivel arm (204).

4. The automated carrier tugger (100) as claimed in claim 1, wherein the swivel arm (204) is integrated with a plurality of tension springs (234A-B), wherein one side of the tension spring (234A) is connected to one side of a shaft gear (324) which is coupled with outer diameter of a bearing unit (314A), and other side of the tension spring (234B) is connected to a plurality of stand offs (238A-B), wherein the plurality of stand offs (238A-B) is mounted onto the base plate (214).

5. The automated carrier tugger (100) as claimed in claim 1, wherein the swivel arm (204) is attached with the tugging unit (106) is free to swivel overcoming a spring force when the AMR (102) is moving in at least one direction, wherein the plurality of tension springs (234A-B) exert an equal tension force on a plurality of bearing units (314A-B).

6. The automated carrier tugger (100) as claimed in claim 1, wherein a shaft gear (324) is mounted onto the bearing housing (320), wherein the bearing housing (320) is coupled with the plurality of bearing units (314A-B), wherein the plurality of integrated semi cylindrical clamps (224A-B) and a plurality of free semi-cylindrical clamps (228A-B) are also mounted on the bearing housing (320).

7. The automated carrier tugger (100) as claimed in claim 1, wherein a motor (310) and a motor gear (318) are engaged into the shaft gear (324), wherein the motor (310) causing the swivel arm (204) to rotate for attaining a required orientation.

8. The automated carrier tugger (100) as claimed in claim 1, wherein a locking coupling (232) comprises a mirror teeth profile and a lock engager (230) comprises an inverse teeth profile to mesh and provide a load taking lock by without transferring an additional load to the motor (310), wherein the locking coupling (232) and the lock engager (230) is engaged by a lock engaging actuator (218) and the vertical axis slide (504).

9. The automated carrier tugger (100) as claimed in claim 1, wherein a lock engaging actuator (218) operates in forward or backward direction to pivot a floating connector (406) about a hinge point (316), wherein the floating connector (406) actuates the motor (310) along with a motor mounting plate (402) by a sliding contact between the motor mounting plate (402) and the floating connector (406).

10. The automated carrier tugger (100) as claimed in claim 1, wherein a lock engager (230) moves in a forward direction by the lock engaging actuator (218) to lock the swivel arm (204) at a particular angle, wherein a point P on the motor gear (318) and a point Q on the shaft gear (324) is not connected when a point A on the lock engager (230) is locked with a point B on the locking coupling (232).

11. The automated carrier tugger (100) as claimed in claim 1, wherein the lock engager (230) moves in a backward direction by the lock engaging actuator (218) to enable the motor (310) to rotate the swivel arm (204) at a required angle, wherein the point A on the lock engager (230) and the point B on the locking coupling (232) is not connected when a point P on the motor gear (318) is locked with a point Q on the shaft gear (324).

12. The automated carrier tugger (100) as claimed in claim 1, wherein the lock engaging actuator (218) is at home position to rotate the swivel arm (204) within a required angle during forward movement, wherein the point A on the lock engager (230) is not connected the point B on the locking coupling (232), wherein the point P on the motor gear (318) is not connected with the point Q on the shaft gear (324).

13. The automated carrier tugger (100) as claimed in claim 12, wherein position of the swivel arm (204) is positioned at center of the rotary joint unit (104) by the plurality of tension springs (234A-B) attached between a plurality of standoffs (238A-B) and the shaft gear (324) when the tugging unit (106) is at an idle position.

14. The automated carrier tugger (100) as claimed in claim 1, wherein the single rear clamp (518) is positioned below the horizontal bar (602) for moving the vertical axis slide (504) upwards and a flange of the single rear clamp (518) to hold a rear face of the horizontal bar (602) of the carrier (108).

15. The automated carrier tugger (100) as claimed in claim 1, wherein the plurality of front clamps (520A-B) with the plurality of flanges (524A-B) moves forward towards the carrier (108) thereby the plurality of flanges (524A-B) contacts a front side of the horizontal bar (602) to establish a rigid clamping connection between the carrier (108) and the AMR (102).

16. The automated carrier tugger (100) as claimed in claim 1, wherein the tugging unit (106) for clamping a vertical rod (802) of the carrier (108), comprising:
a motor (702) actuates causing a left hand (LH) lead screw and a right hand (RH) lead screw (706) to move a left hand (LH) rack gear (710A) and a right hand (RH) rack gear (710B) at least one desired direction, wherein the LH rack gear (710A) and the RH rack gear (710B) rotates a plurality of swivel clamps (714A-D) to clamp and de-clamp the vertical rod (802) of the carrier (108).

17. The automated carrier tugger (100) as claimed in claim 16, wherein the LH rack gear (710A) and the RH rack gear (710B) move inwards to clamp the vertical rod (802) of the carrier (108), wherein the LH rack gear (710A) and the RH rack gear (710B) move outwards to de-clamp the vertical rod (802) of the carrier (108).

18. The automated carrier tugger (100) as claimed in claim 16, wherein a plurality of rod butting elements (720A-B) locates the vertical rod (802) and supports tugging of the carrier (108).

* * * * *